(No Model.) 5 Sheets—Sheet 2.

J. W. BALLARD & H. L. FISHER.
DITCHING MACHINE.

No. 370,518. Patented Sept. 27, 1887.

Witnesses.

Inventor:

(No Model.) 5 Sheets—Sheet 3.
J. W. BALLARD & H. L. FISHER.
DITCHING MACHINE.
No. 370,518. Patented Sept. 27, 1887.
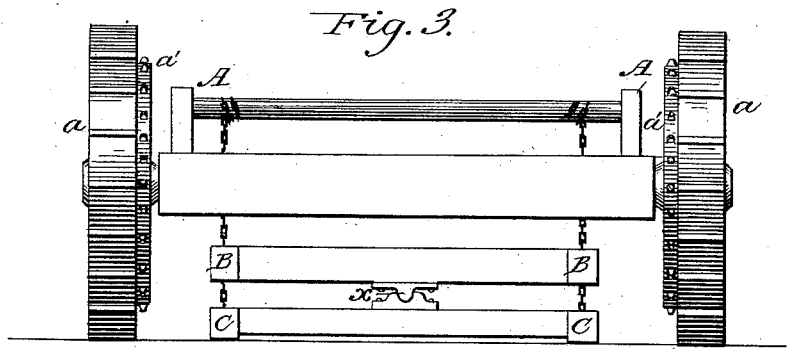
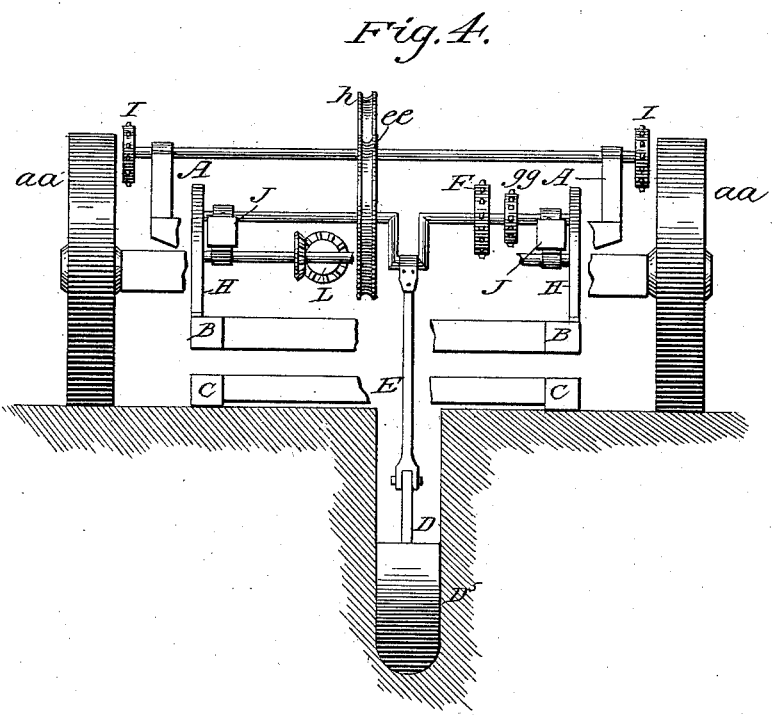
Witnesses.
Inventor:

(No Model.) 5 Sheets—Sheet 4.

J. W. BALLARD & H. L. FISHER.
DITCHING MACHINE.

No. 370,518. Patented Sept. 27, 1887.

Witnesses:

Inventor:
James W. Ballard
Harvey L. Fisher
C. A. Snow & Co.
Attys.

(No Model.) 5 Sheets—Sheet 5.
J. W. BALLARD & H. L. FISHER.
DITCHING MACHINE.
No. 370,518. Patented Sept. 27, 1887.
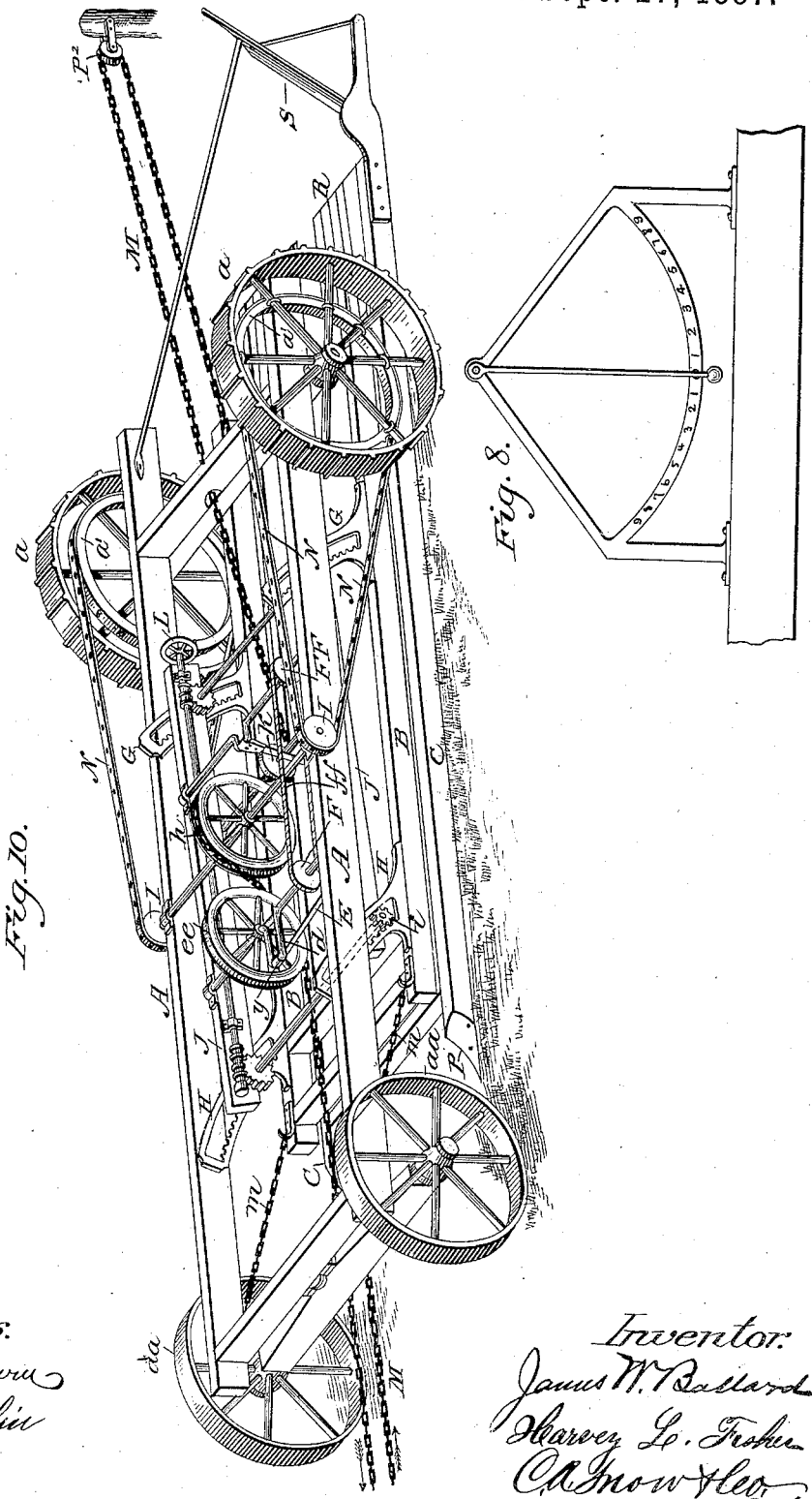

UNITED STATES PATENT OFFICE.

JAMES W. BALLARD AND HARVEY L. FISHER, OF TOLEDO, IOWA, ASSIGNORS TO THE HOWE MANUFACTURING COMPANY.

DITCHING-MACHINE.

SPECIFICATION forming part of Letters Patent No. 370,518, dated September 27, 1887.

Application filed April 19, 1887. Serial No. 235,409. (No model.)

*To all whom it may concern:*

Be it known that we, JAMES W. BALLARD and HARVEY L. FISHER, citizens of the United States, residing at Toledo, in the county of Tama and State of Iowa, have invented a new and useful Ditching-Machine, of which the following is a specification.

Our invention relates to improvements in ditching-machines in which the carriage is a combination of wheels and slides or runners, on which is mounted a heavy steel shovel, a steel shovel cleaner or scraper for removing the earth from the shovel to the side of the ditch, a platform for the storage of tile and for the operator to stand on while placing the tile in the ditch, a plow or scraper for filling the ditch with earth after the tile is placed, together with a series of endless chains, sprocket-wheels, gear-wheels, and corrugated chain-pulleys and shafting connected to a geared capstan or horse-power by an endless chain. We attain these objects by mechanism illustrated in the accompanying drawings.

Figure 1:
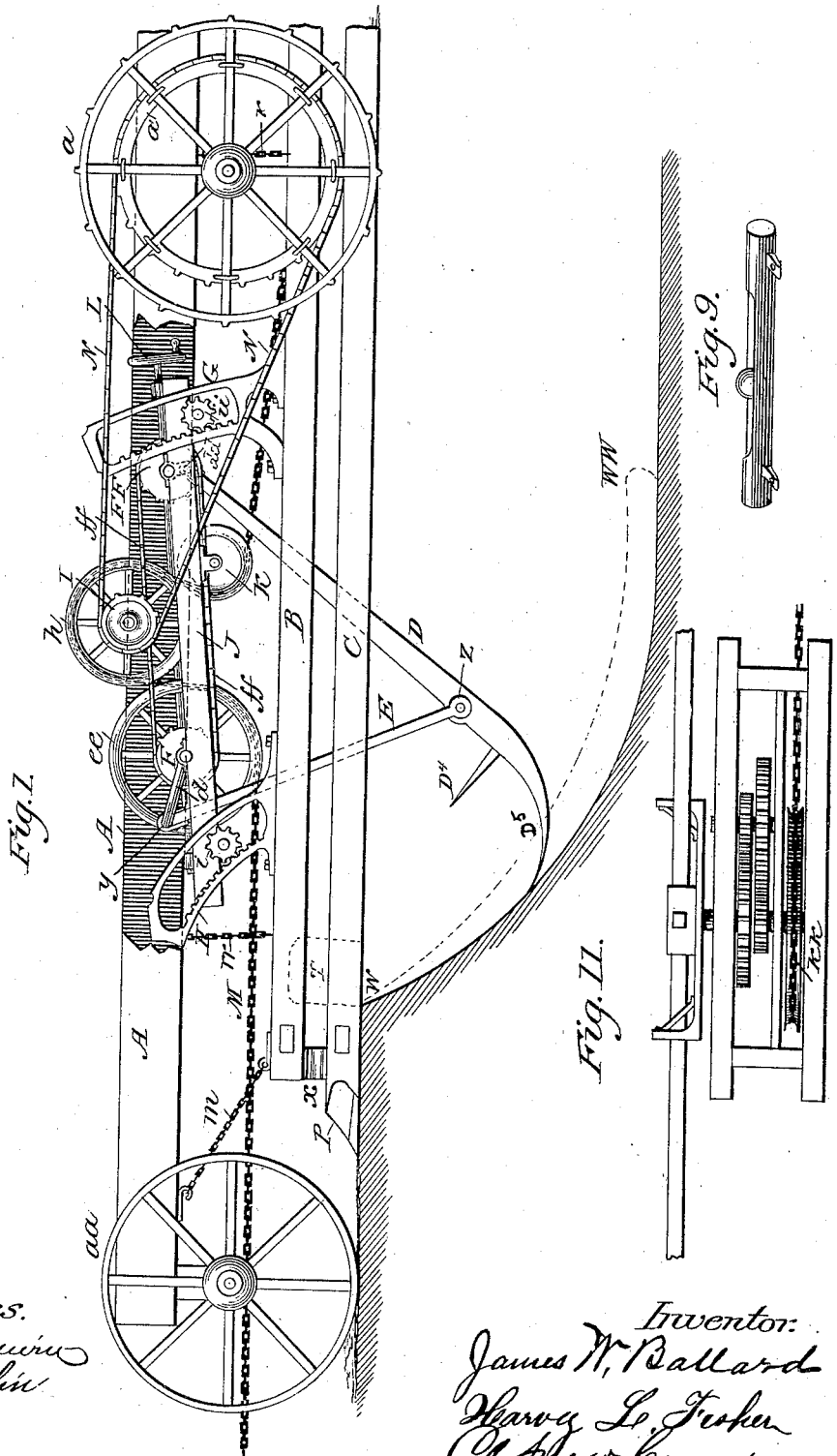
Figure 2:
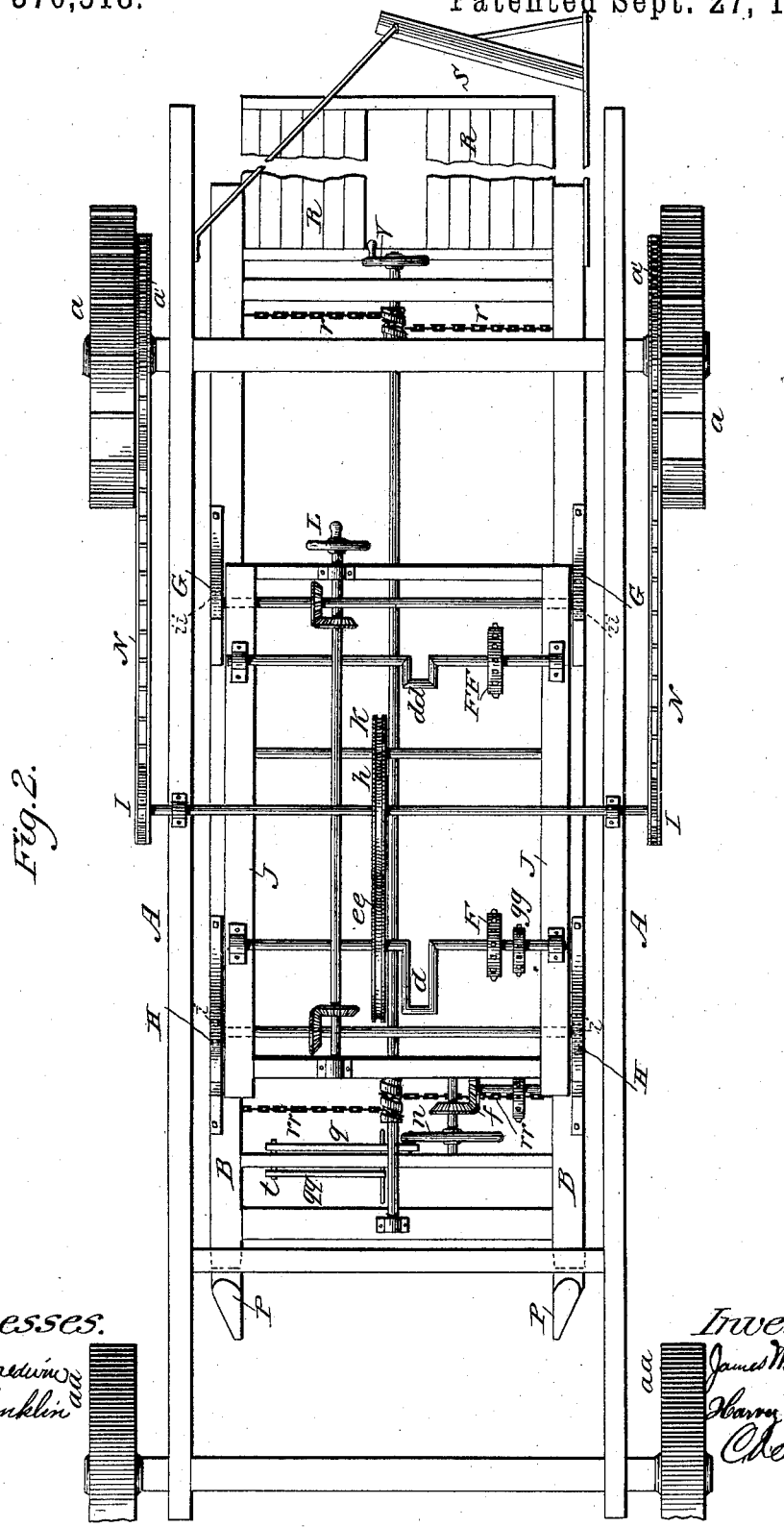
Figure 5:
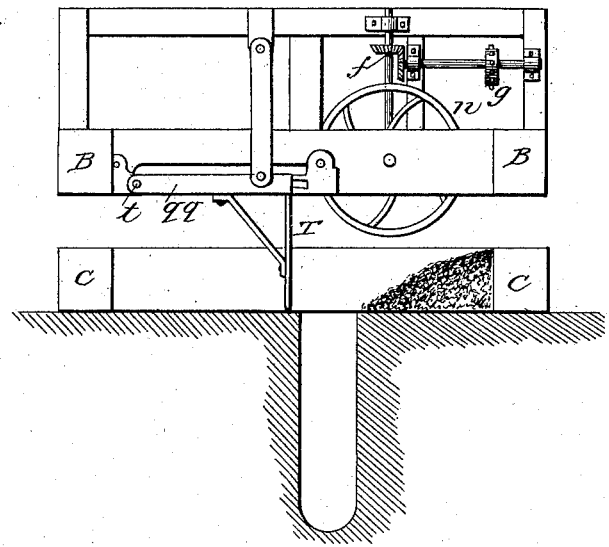
Figure 6:
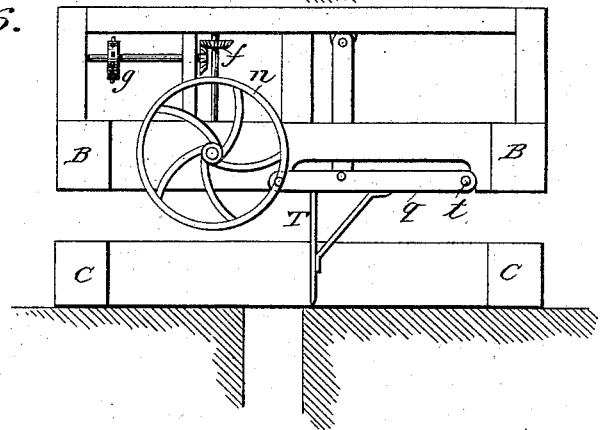
Figure 7:
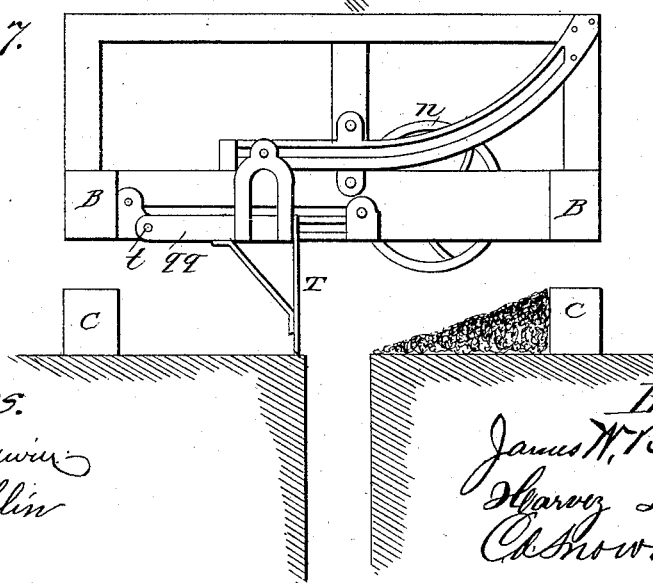

Figure 1 is a vertical section of the machine with the platform and plow and capstan or horse-power detached. Fig. 2 is a top view detached from the capstan. Fig. 3 is a vertical front view of the ditching-machine. Fig. 4 is a vertical rear view with platform and plow detached. Fig. 5 is a front view of the spade cleaner and scraper with the device for operating the same. Fig. 6 is a view of the reverse side of the spade cleaner and scraper and the machinery pertaining thereto. Fig. 7 is a front view of a spade cleaner or scraper attachment to take the place of Fig. 5 in heavy and wet earth; Fig. 8, a pendulum and graduated arc for determining the grade of the ground as traveled over by the ditcher. Fig. 9 is a ball-and-tube level attachment secured to a cross-beam in frame B, to determine when spade D is cutting perpendicular. Fig. 10 is a perspective view of the ditching-machine detached from the capstan or horse-power. Fig. 11 is a vertical section of the capstan or horse-power.

Similar letters refer to similar parts throughout the several views.

The frame A is mounted on bolsters and axle-trees connecting wheels $a$ and $a\,a$. Frame B is mounted on runners or slides C and connected by ball-and-socket attachment X.

H G $i\,i\,i$ are geared standards and pinions attached to frame B for the purpose of raising and lowering frame J, and thereby increasing or decreasing the depth of cut in the ditch by D without changing the elevation of the lift of spade D at W. The steel ditching-spade D gets an elliptical movement while in operation, traveling forward while cutting earth on the line from W W to W and back, while not cutting, on the dotted line to W W. This movement is caused by its being attached at its outer end to crank $d\,d$ by collar-strap $w$ and to crank $d$ by collar-strap $y$, to pitman E, and connected at joint $z$ at a distance of one-fourth its length from point $D^5$.

Cranks $d$ and $d\,d$ are operated by sprocket-wheels F and F F, of equal dimension, connected by chain belt $f\,f$, and derive power and motion from chain-pulley $e\,e$, which is operated by endless chain M, attached to chain-pulley $k\,k$, Fig. 11.

Sprocket-rim $a'$ is rigidly attached to carriage-wheel $a$, and connected with sprocket-wheel I by a chain belt, N, for the purpose of giving a forward motion to the ditching-machine equal to the cut of spade D at each revolution or stroke. Sprocket-rim $a'$ and sprocket-wheel I and chain belt N derive their power and motion from chain-pulley $h$, which receives its power and motion from endless chain M, attached to and around chain-pulley $k\,k$, Fig. 11.

Crank-shaft L is attached to pinion-shaft $i$ and $i\,i$ for the purpose of raising and lowering frame J. Chain-pulley K is for the purpose of tightening endless chain M on chain-pulleys $e\,e$ and $h$. Endless chain M passes around chain-pulley $k\,k$, Fig. 11, thence on a line to and under ditcher to and through snatch-block $P^2$, thence forward under tightener-pulley K and over chain-pulley $h$ and under chain-pulley $e\,e$, and back to and around chain-pulley $k\,k$ on capstan or horse-power, Fig. 11.

The front end of runners C is mounted with plow P, for the purpose of removing small hillocks or uneven places on the ground in the line of said runner.

Draw-chain $m$ is attached to top frame of runners B and to carriage-frame A, for the purpose of giving a forward motion to the machinery attached to frame B without oscillation or vibration.

Steel scraper T is attached to slide-bar $q\ q$ and connected with pitman $q$ by pin $t$, connected with crank-wheel $n$, attached to bevel-gear $f$, and connected with sprocket-wheels $g$ and $g\ g$ by chain-belt attachment having the same motion of spade D, passing directly over the top of point $D^5$ and in front of earth-shield $D^4$ at the same time that point of spade $D^5$ reaches W on top of ground.

Crank-rod V is attached to frame B, around which chain $r$ and $r\ r$ passes and is secured to runner C, for the purpose of keeping the machinery thereunto attached in a vertical position.

Platform R, with opening in the center, is an attachment for the purpose of carrying tile and an operator to place the same in the ditch while the machine is in motion.

Plow or scraper S is an attachment for the purpose of filling up the ditch with earth after the tile is laid.

Having thus described our invention, what we claim as new, and desire to secure by Letters Patent, is—

1. The combination of wheels $a$ and $a\ a$, frame A, frame B, runners C, coupling X, and draw-chain $m$, as a carriage on which the machinery of the ditching-machine is mounted.

2. Ditching-shovel D, having point $D^5$ and earth-shield $D^4$, in combination with sprocket-wheels F and F F, as described.

3. Geared standards H and G and geared pinions $i$ and $i\ i$, and frame J, and crank-shaft L, as a raising and lowering device, as described.

4. A ditching-machine having the platform R at its rear end and the plow or scraper S in rear of said platform, substantially as set forth.

5. The combination of the spade-cleaner T, slide-bar $q\ q$ and pitman $q$, and the crank-wheel $n$, as set forth.

6. The combination, with a horse-power and a ditching-machine having the pulleys $h$, $e\ e$, and K, of the endless chain extending from the horse-power under the ditching-machine to a pulley, $P^2$, fixedly secured in rear of the same, then under the pulley K, over the pulley $h$, and under the pulley $e\ e$ back to the horse-power, substantially as specified.

JAMES W. BALLARD.
HARVEY L. FISHER.

In presence of—
HIRAM BALDWIN,
L. CLARK.